US009692807B2

(12) United States Patent
Baek (10) Patent No.: US 9,692,807 B2
(45) Date of Patent: Jun. 27, 2017

(54) MOBILE ITINERANT SOFTWARE AGENT CARRYING ITINERARY AND DATA WITHIN

(71) Applicant: International Business Machines Corporation, Armonk, NY (US)

(72) Inventor: Ock K. Baek, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 14/088,806

(22) Filed: Nov. 25, 2013

(65) Prior Publication Data

US 2014/0201255 A1  Jul. 17, 2014

(30) Foreign Application Priority Data

Jan. 11, 2013  (CA) ...................................... 2801730

(51) Int. Cl.
*G06F 15/16* (2006.01)
*H04L 29/08* (2006.01)

(52) U.S. Cl.
CPC ................................. *H04L 67/10* (2013.01)

(58) Field of Classification Search
None
See application file for complete search history.

(56) References Cited

U.S. PATENT DOCUMENTS

| 6,009,456 A | 12/1999 | Frew et al. |
| 7,861,252 B2 | 12/2010 | Uszok et al. |
| 2006/0168061 A1* | 7/2006 | Enatsu ................ H04L 12/5855 709/206 |
| 2011/0161290 A1 | 6/2011 | Waterman et al. |

OTHER PUBLICATIONS

Self-Adapative Mobile Software Agent for Dynamic Provisioning of Virtual Electronic Medical Records on Demand, Source: IP.com, IP Disclosure No. IPCOM000194880D, dated Apr. 12, 2010, Retrieved from Internet: URL: http://ip.com/IPCOM/000194880, 1 page.
Chess et al., Secure, remote applications for large public networks, Itinerant Agents for Mobile Computing, IEEE Personal Communications, Oct. 1995, 1070-9916/95 copyright 1995 IEEE, pp. 34-49.

* cited by examiner

*Primary Examiner* — Umar Cheema
*Assistant Examiner* — Gregory P Tolchinsky
(74) *Attorney, Agent, or Firm* — Schmeiser, Olsen & Watts, LLP; John Pivnichny (57) ABSTRACT

A method and data processing system for using agent software to perform data processing on multiple computer systems. The agent software is sequentially migrated from a user computer system to each system of N computer systems, after which the agent software is returned to the user computer system with a final result that includes output results obtained from execution of run time instructions in the agent software on each computer system of the N computer systems. N is at least 1.

13 Claims, 6 Drawing Sheets

Agent software management
system
300

MOBILE ITINERANT SOFTWARE AGENT CARRYING ITINERARY AND DATA WITHIN

TECHNICAL FIELD

This disclosure relates generally to mobile agents in a data processing system and more specifically to mobile itinerant agents for processing sensitive data or large volume of data in the data processing system.

BACKGROUND

When electronic records are subject to compliance requirements of Privacy laws the electronic records need to be secured and protected to maintain respective characteristics of confidentiality and data integrity. The term "privacy" (with lower-case p) refers to confidentiality of personal information; whereas Privacy (with capital P) refers to statutory requirements such as in formal regulations of a country. Additionally, protection may further be required to maintain inherent intellectual property rights associated with the electronic records.

Typically electronic records containing personal information are subject to statutory requirements for protection of Privacy. However, electronic records containing personal information cannot typically be transmitted outside the premises of an organizational entity while still maintaining compliance with the maintenance of Privacy requirements. Electronic records containing sensitive information or associative intellectual property need to be secured and protected when stored as well as when transmitted over a network to maintain confidentiality and data integrity, to prevent the electronic records from unauthorized access or alteration.

Electronic records may also be very large with respect to the volume of data comprising the records. Movement of the large volumes of data may cause degraded network and application performance due to network latency associated with transmission over a network.

BRIEF SUMMARY

The present invention provides a method for using agent software to perform data processing on computer systems $S_1, S_2, \ldots, S_N$ by having one or more processors $P_1, P_2, \ldots, P_N$ of computer systems $S_1, S_2, \ldots, S_N$ execute a set of run time instructions $I_1, I_2, \ldots, I_N$, respectively, and to return output resulting from the data processing to a user computer system $S_0$, wherein N is at least 1, and wherein an index n is initially 1, said method comprising:

receiving, by the one or more processors $P_n$ of computer system $S_n$, the agent software from computer system $S_{n-1}$;

executing, by the one or more processors $P_n$ of the computer system $S_n$, the set of run time instructions $I_n$ comprised by the agent software, said executing the set of run time instructions $I_n$ comprising utilizing resources and data comprised by computer system $S_n$ to generate an output result $R_n$ and storing the output result $R_n$ in the agent software and ascertaining whether n<N or n=N;

if said ascertaining ascertains that n<N, then said executing the set of run time instructions $I_n$ comprises migrating the agent software to system $S_{n+1}$ after which the method comprises performing said receiving and said executing with the index n incremented by 1;

if said ascertaining ascertains that n=N, then said executing the set of run time instructions $I_n$ comprises returning the agent software to computer system $S_0$ for enabling computer system $S_0$ to obtain a final result comprising the output results $R_1, R_2, \ldots, R_N$.

The present invention provides a computer program product, comprising one or more computer-readable storage devices and N sets of run time instructions $I_1, I_2, \ldots, I_N$ respectively stored on the one or more computer-readable storage devices, said sets of run time instructions $I_1, I_2, \ldots, I_N$ which, upon being executed by one or more processors $P_1, P_2, \ldots, P_N$ of computer systems $S_1, S_2, \ldots, S_N$, respectively, implement a method for using agent software to perform data processing on computer systems $S_1, S_2, \ldots, S_N$ and to return output resulting from the data processing to a user computer system $S_0$, wherein N is at least 1, and wherein an index n is initially 1, said method comprising:

receiving, by the one or more processors $P_n$ of computer system $S_n$, the agent software from computer system $S_{n-1}$;

executing, by the one or more processors $P_n$ of the computer system $S_n$, the set of run time instructions $I_n$ comprised by the agent software, said executing the set of run time instructions $I_n$ comprising utilizing resources and data comprised by computer system $S_n$ to generate an output result $R_n$ and storing the output result $R_n$ in the agent software and ascertaining whether n<N or n=N;

if said ascertaining ascertains that n<N, then said executing the set of run time instructions $I_n$ comprises migrating the agent software to system $S_{n+1}$ after which the method comprises performing said receiving and said executing with the index n incremented by 1;

if said ascertaining ascertains that n=N, then said executing the set of run time instructions $I_n$ comprises returning the agent software to computer system $S_0$ for enabling computer system $S_0$ to obtain a final result comprising the output results $R_1, R_2, \ldots, R_N$.

The present invention provides a data processing system comprising computer systems $S_1, S_2, \ldots, S_N$ that include a respective one or more processors $P_1, P_2, \ldots, P_N$ and a respective one or more memories $M_1, M_2, \ldots, M_N$, one or more computer-readable storage devices and N sets of run time instructions $I_1, I_2, \ldots, I_N$ stored on the one or more computer-readable storage devices, said sets of run time instructions $I_1, I_2, \ldots, I_N$ which, upon being executed by the one or more processors $P_1, P_2, \ldots, P_N$ of computer systems $S_1, S_2, \ldots, S_N$ via the one or more memories $M_1, M_2, \ldots, M_N$, respectively, implement a method for using agent software to perform data processing on computer systems $S_1, S_2, \ldots, S_N$ and to return output resulting from the data processing to a user computer system $S_0$, wherein N is at least 1, and wherein an index n is initially 1, said method comprising:

receiving, by the one or more processors $P_n$ of computer system $S_n$, the agent software from computer system $S_{n-1}$;

executing, by the one or more processors $P_n$ of the computer system $S_n$, the set of run time instructions comprised by the agent software, said executing the set of run time instructions $I_n$ comprising utilizing resources and data comprised by computer system $S_n$ to generate an output result $R_n$ and storing the output result $R_n$ in the agent software and ascertaining whether n<N or n=N;

if said ascertaining ascertains that n<N, then said executing the set of run time instructions $I_n$ comprises migrating the agent software to system $S_{n+1}$ after which the method comprises performing said receiving and said executing with the index n incremented by 1;

if said ascertaining ascertains that n=N, then said executing the set of run time instructions $I_n$ comprises returning the agent software to computer system $S_0$ for enabling computer system $S_0$ to obtain a final result comprising the output results $R_1, R_2, \ldots, R_N$.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", "component", or "system." Furthermore, aspects of the present invention may take the form of a computer program product embodied in one or more computer readable medium(s) having computer readable program code embodied thereon.

Any combination of one or more computer-readable data storage devices may be utilized. A computer-readable data storage device may be, for example, but not limited to, an electronic, magnetic, optical, or semiconductor system, apparatus, or device, or any suitable combination of the foregoing, but does not encompass propagation media. More specific examples (a non-exhaustive list) of the computer-readable data storage devices would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing, but does not encompass propagation media. In the context of this document, a computer-readable data storage device may be any tangible device that can store a program for use by or in connection with an instruction execution system, apparatus, or device.

Computer program code for carrying out operations for aspects of the present disclosure may be written in any combination of one or more programming languages, including an object oriented programming language such as Java®, Smalltalk, C++, Perl, Python, LISP, PROLOG, b (Harvard Little b), or the like and conventional procedural programming languages, such as the "C" programming language or similar programming languages. Java and all Java-based trademarks and logos are trademarks of Oracle Corporation, and/or its affiliates, in the United States, other countries or both. The program code may execute entirely on the user's computer, partly on the user's computer, as a stand-alone software package, partly on the user's computer and partly on one or more remote computers or entirely on the remote computers or servers. In the latter scenario, the remote computers may be connected to the user's computer through any type of network, including a local area network (LAN) or a wide area network (WAN), or the connection may be made to one or more external computers (for example, through the Internet using an Internet Service Provider).

Aspects of the present disclosure are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, a set of interlinked computers and storage systems for "cloud" computing or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable data storage device that can direct a computer, a set of interlinked computers or other programmable data processing apparatus to function in a particular manner, such that the instructions stored in the computer readable data storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
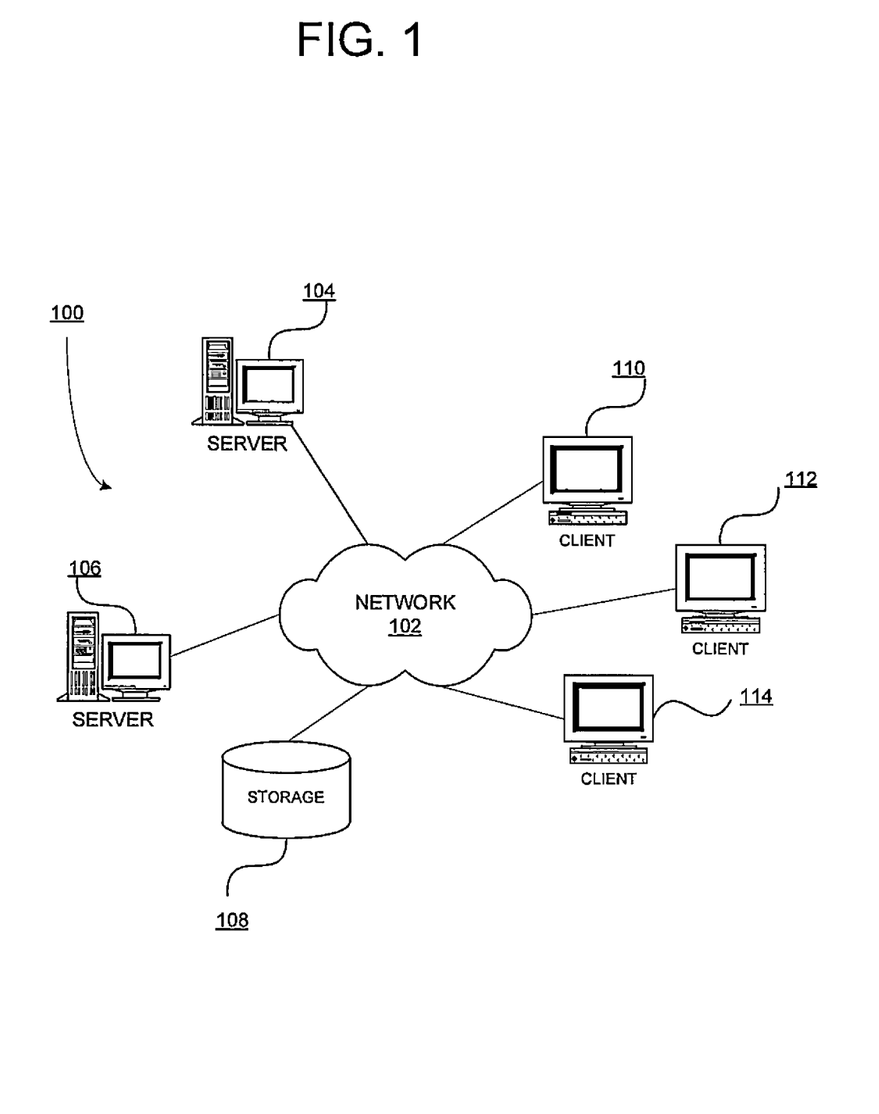
FIG. 1 is a block diagram of an exemplary network data processing system operable for various embodiments of an agent software management system of the disclosure.
Figure 2:
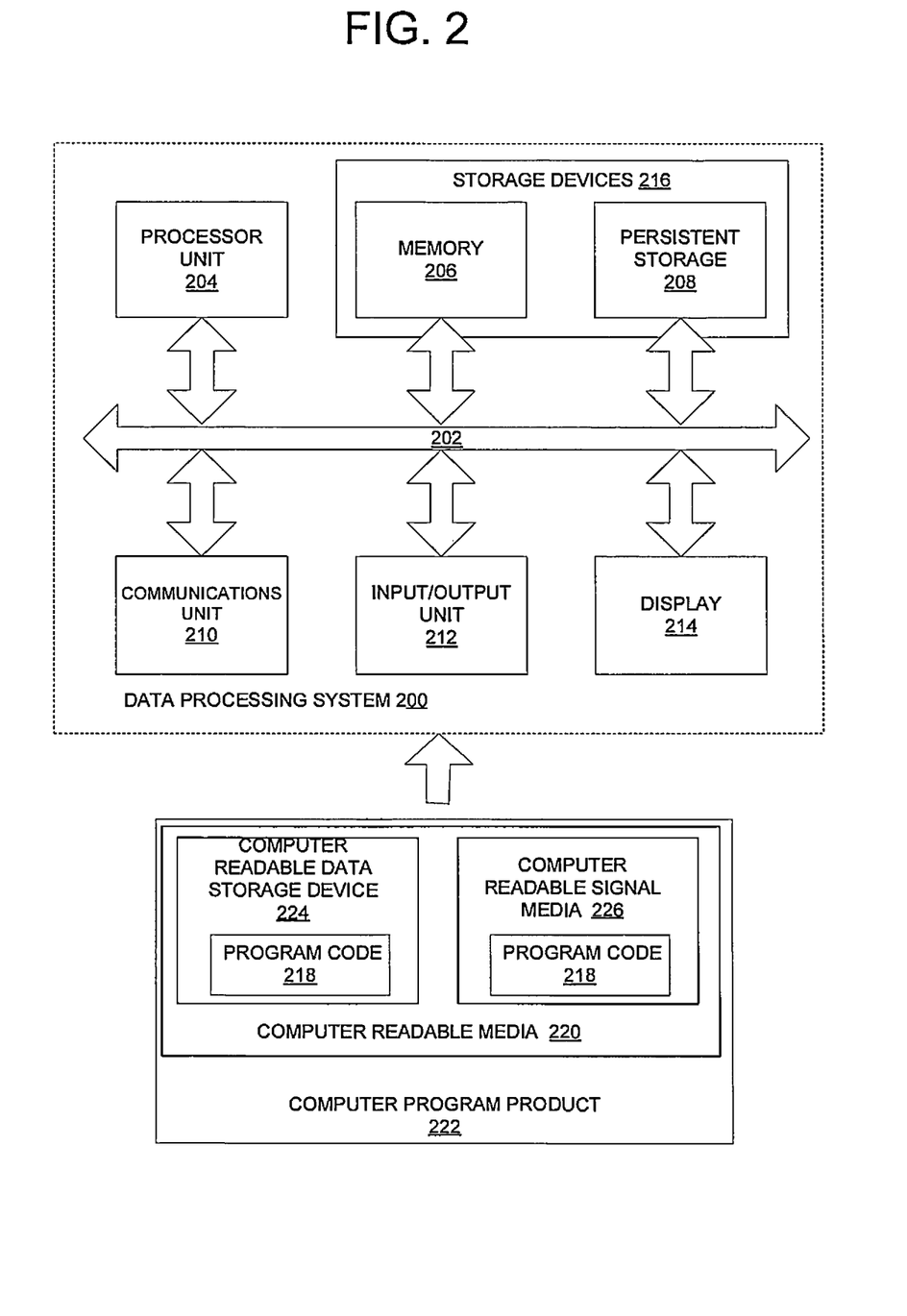
FIG. 2 is a block diagram of an exemplary data processing system operable for various embodiments of an agent software management system of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments of an agent software management system of the disclosure may be implemented. Network data processing system 100 is a network of computers in which the illustrative embodiments may be implemented. Network data processing system 100 contains network 102, which is the medium used to provide communications links between various devices, storage units, appliances, and computers connected together within network data processing system 100 and through which agents of an embodiment of the disclosure traverse in performance of processing data at specific destinations. Network 102 may include connections, such as wire, wireless communication links, or fiber optic cables.

In the depicted example, server 104 and server 106 connect to network 102 along with storage unit 108 which may be used to contain a repository of agents of the agent software management system. In addition, clients 110, 112, and 114 connect to network 102. Clients 110, 112, and 114 may be, for example, personal computers, appliances or network computers. In the depicted example, server 104 provides data, such as boot files, operating system images, and applications to clients 110, 112, and 114. Clients 110, 112, and 114 are clients to server 104 in this example. In one example, an agent of the agent software management system initiated by a request from one of clients 110, 112, and 114 and traverses network 102 to visit servers 104 and 106 and generates a result for presentation to the requester. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments the agent software management system of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs, including those of the agent software management system may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments of the agent software management system may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable data storage device, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media or a computer readable data storage device 224, which does not encompass transmission, or signal media. In some instances, computer readable storage media 220 may not be removable.

Alternatively, program code 218 may be transferred to data processing system 200 from computer readable media 220 through a communications link to communications unit 210 and/or through a connection to input/output unit 212 as computer readable signal media 226. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a method for mobile itinerant agents for processing sensitive data is presented. Processor unit 204, in response to receiving a request from a requester, migrates an agent to a location of the requester. At the location of the requester the agent receives an itinerary, a set of security credentials and a set of run time instructions for use at one or more destinations of the itinerary. The agent migrates autonomously from the location of the requester to a next destination in a sequence of the itinerary, presenting one or more security credentials from the set of security credentials received using processor 204 to gain access to the resources and data at the next destination and processing data at the next destination using run time instructions from the set of run time instructions to generate a result. In response to a determination that there is no next destination, the agent using processor 204 determines whether a final result is portable and in response to a determination that the final result is portable, further determines whether to make the final result secure. In response to a determination to make the final result secure, the final result is made secure and the final result is embedded within the agent using processor 204.

Embodiments of the disclosed process address Privacy issues typically associated with processing of electronic records containing personal information, confidentiality and data integrity of sensitive data, and performance issues associated with sharing a large volume of data across the network.

Embodiments of the disclosure further enable software in the form of one or more sets of computer executable instructions to move to a location of the input data for processing and to convey result data within a data structure comprising the program, as opposed to moving the input data to software for processing and sending result data across the network in a conventional computing model. In an embodiment of the computing model of the disclosure, information is not transmitted by itself across the network rather the information is conveyed, directly or indirectly, within the software program, and therefore the information is made invisible or opaque to an external viewer because the information is imbedded in the software program. When the information is conveyed within the software program, the information of a result can be encrypted and/or compressed.

Embodiments of the disclosed method obviate a need to transmit electronic records containing personal information outside organizational premises, a need to encrypt electronic records containing sensitive data for transmission across a network, or a need to transmit large volume of data across a network. A software program in an embodiment of the disclosed method migrates autonomously to systems where relevant data resides based on an itinerary assigned to the particular software program, presents an appropriate set of security credentials to get access to the resources and data, performs the assigned tasks based on a set of instructions, and returns with result data conveyed inside the particular software program.

When the result data contains personal information or confidential information, the software of an embodiment of the disclosed method stores the result data on a secure system in a trusted environment and returns with a data locator as a reference to the result data on the secure system.

When result data are too large to be conveyed within the particular software program, the particular software program either compress the data to determine whether the compressed result data can be conveyed within (for example, video data can be compressed using a ratio of 100:1 with little visible quality loss) or stores the result data in one or more secure data storage devices of a storage system and returns with a data locator reference to the data on the secure system.

Therefore, the electronic records that contain personal information, sensitive information or are very large no longer need to be transmitted across a network. Only the result data are conveyed within the software of the particular software program. Since the data are imbedded within the particular software program, the data cannot be distinguished from the program code of the particular software program.

In summary, embodiments of the disclosed process enables the raw data to be kept at the source of collection for compliance to privacy laws, for protection of intellectual property rights, and for assurance of confidentiality, currency and integrity of data. The preprocessed or post-processed data can be also kept at the source of generation, especially when the data contains personal information or confidential information, or a very large volume of data. Since a large volume of data no longer needs to be transmitted across the network, performance issues associated with network latency and data propagation delays typical of large data transmissions are also addressed.

Figure 3:
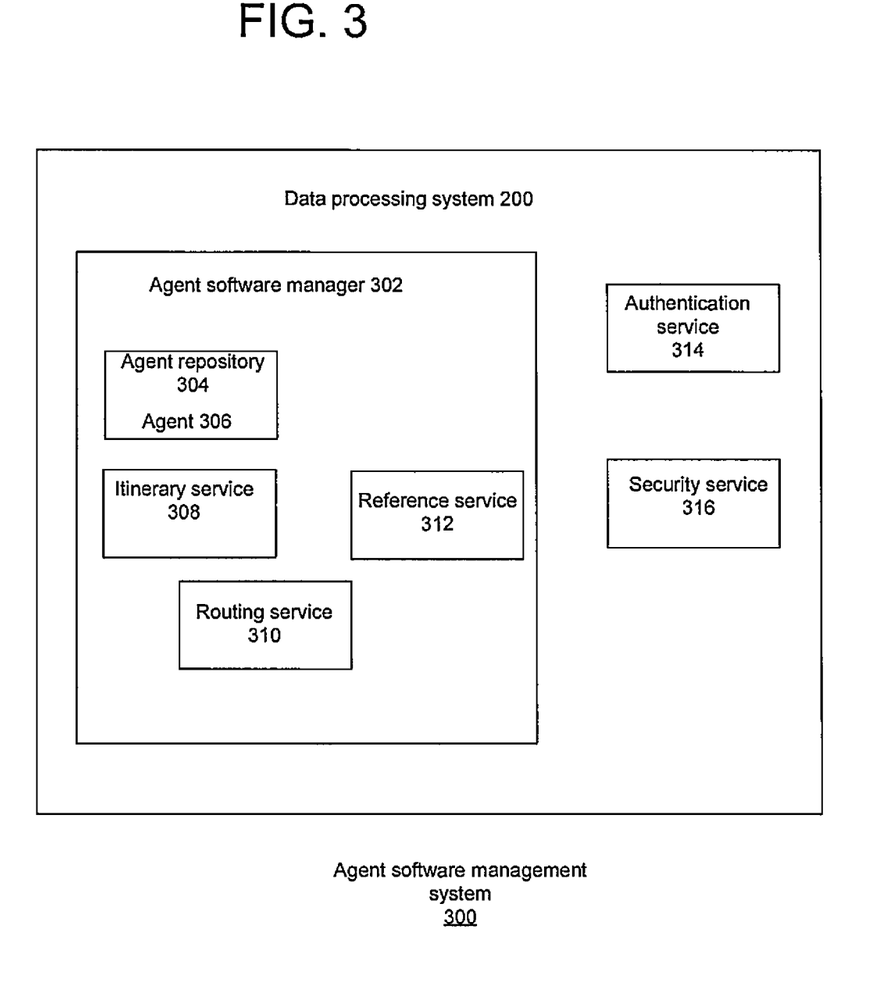
FIG. 3 is a block diagram of an agent software management system operable for various embodiments of the disclosure.

With reference to FIG. 3 a block diagram of an agent software management system operable for various embodiments of the disclosure is presented. Agent software management system 300 is an example of agent software in one illustrative embodiment of the disclosed agent software management system previously presented with regard to network data processing system 100 of FIG. 1 and data processing system 200 of FIG. 2.

A requester using a user interface prompting from a list of one or more predetermined requests or applications selects agent 306 directly or indirectly from agent repository 304 containing one or more agents. In the following discussion a requester may be a human user using a graphical user interface or command line interaction or another application using one or more programming interfaces. For example, a requester may select a specific agent to perform a corresponding request. In another example, the agent may be spawned as a result of choosing an application and is thus chosen indirectly.

Agent 306 is a travelling entity that traverses one or more networks to visit one or more destinations as needed to access and process data associated with resolving a particular request. Agent 306 is autonomous being enabled to determine where to go and what to do, having received an itinerary, including a set of security credentials and a set of instructions. Agent 306 roams around the network autonomously, based on the itinerary carried within, without any assistance from the requester and returns to the requester upon completion of the route and tasks. Thus agent 306 is a mobile itinerant agent for processing sensitive data at one or more destinations. Agent 306 uses a set of security credentials to gain access to the resources and data at a destination and uses a set of instructions for accessing, transforming and processing data. The set of security credentials and set of instructions used by agent 306 at a particular destination can differ from one destination to a next destination as required by the particular destination. Agent 306, upon completion of processing data associated with the request delivers a result to the requester. The result may be in the form of a data object or a reference to the data object of the result.

For example, when the result is too large to convey by agent 306, a reference to the location of the result is conveyed within agent 306. The location of the result is a secure temporal storage location in a secure storage environment.

Agent software manager 302 leverages support of underlying data processing 200 of FIG. 2 for typical services including process management, networking device support and data management. In particular agent software manager 302 relies upon data processing 200 for authentication service 314 and security service 316 for other security services such as access control. Authentication service 314 provides a capability of verifying whether a requester of a service or a data access is authorized to gain access to the service or data of the request. Authentication service 314 thus ensures necessary permissions are in place before enabling an operation of agent software manager 302 to occur.

Authentication service 314 further validates credentials to agent 306 for the purposes of authentication on each system identified as a destination during the processing of the request. Authentication is supported within data processing system 200 and across other data processing systems, such as server 104 and server 106 all of network data processing system 100 of FIG. 1 which interact with one or more of agent 306 of agent software manager 302.

In a similar manner agent 306 of agent software manager 302 uses security service 316 to obtain encryption and decryption services when required to ensure safety of a particular processing result. Additional securing of a result may not be required because the result when conveyed within agent 306 is embedded and therefore opaque to a casual observer. To the casual observer the result would appear as typical binary code with the executable software program code of agent 306. Thus the result is hidden in plain sight.

Itinerary service 308 provides a capability to define a route comprising destinations agent 306 is to visit to achieve the result of a request. An itinerary may be predetermined and selected by a requester using a user interface prompting from a list of one or more requests and destinations. Additional destinations may be determined or discovered using intermediate results while processing the request. Thus an itinerary of embodiments of the disclosed process may be composed of selected, predetermined, or discovered destinations or a combination thereof.

Itinerary service 308 further includes a set of security credentials and a set of runtime instructions needed to enable agent 306 to perform the assigned tasks. The security credentials presented by the agent at the destination to access the computing resources and data of the destination and the runtime instructions are for processing the data the destination. The requester thus provides three sets of data for agent 306: itinerary, security credentials and instructions (e.g. input data format, data parsing rules, runtime parameters)

Routing service 310 provides a capability of defining a path between destinations agent 306 is required to visit during processing of a request. Routing service 310 interacts with authentication service 314 to announce or identify destinations to enable authentication service 314 to supply necessary permission credentials to agent 306.

Reference service 312 provides a capability to save a result in a temporal location rather than convey the result directly within agent. A reference may be a pointer to a result including a universal resource locator or a path definition leading to the specific location of the result. When a result is thus saved, the location is a secure location to protect the integrity of the result. When the result is delivered to the requester as a reference the reference is resolved using typical resolution operations appropriate for the type of reference and environment of the requester.

Figure 4:
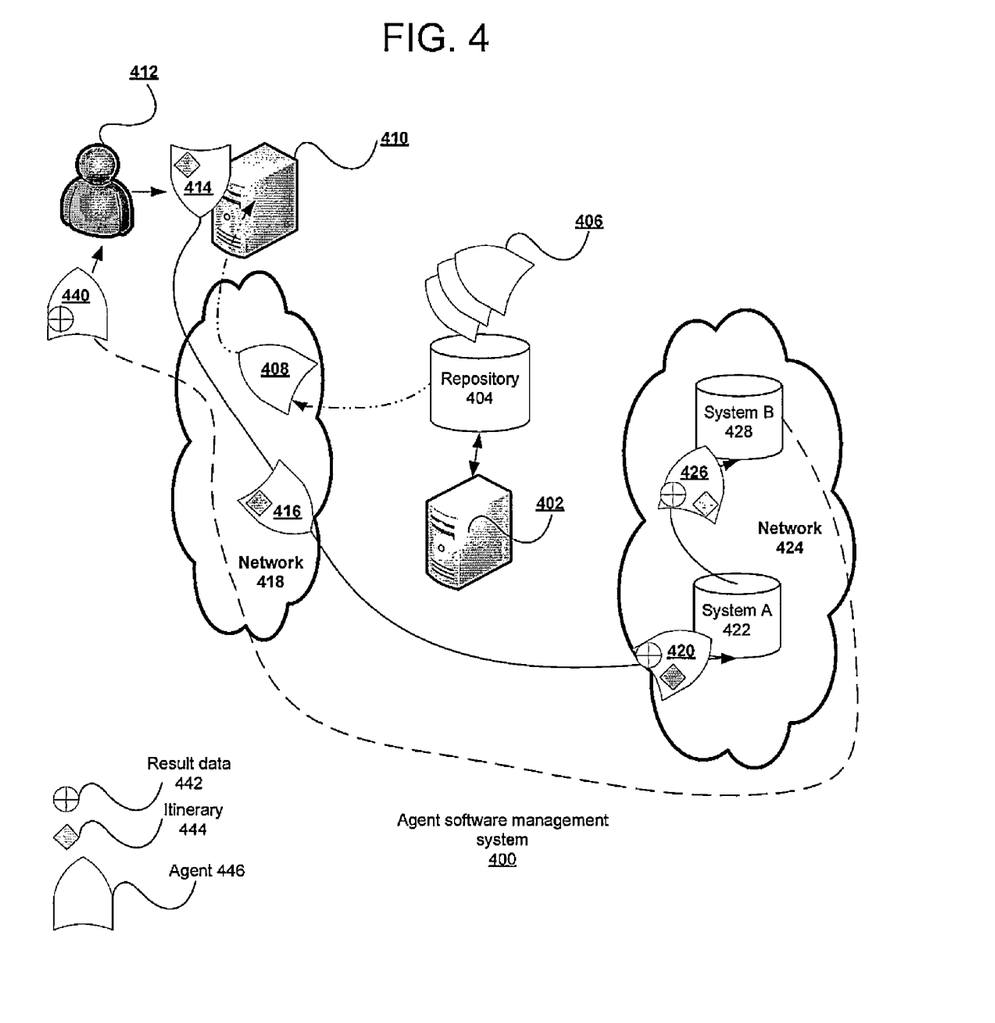
FIG. 4 is a block diagram of a data flow using the agent software management system of FIG. 3, carrying within an agent a set of instructions pertinent to performing the assigned tasks, operable for various embodiments of the disclosure.

With reference to FIG. 4 a block diagram of data flow using the agent software management system [carrying within an agent a set of instructions pertinent to performing the assigned tasks] of FIG. 3 operable for various embodiments of the disclosure is presented. Agent software management system 400 is an example of agent software data flows in one illustrative embodiment of the disclosed agent software management system. The data and control flows depicted occur when a user 412 activates an agent from a set of agent software 406 from a software repository 404 or from an end-user device upon browsing the agent software catalog of software repository 404 operating on server 402.

In response to activation by user 412 agent software automatically migrates to the end-user, user 412 from the agent software library of repository 404 through network 418. In this initial form agent 408 contains only initial information with respect to processing and visiting the destination of user 412. No result or itinerary information is available at this stage.

The agent software interacts with user 412 to acquire a respective itinerary, noted as itinerary 444, as shown in the state of agent 414. A user may provide one or more specific destinations to form an itinerary dynamically. In another example, an itinerary can be prebuilt and registered in a library to enable the agent to access a library to acquire an itinerary, as an alternative. The itinerary typically provides a shortest path between destinations, however subsequent processing and resource availability may modify an initial itinerary.

The agent software interacts with user 412 to acquire a set of security credentials, included as a first portion of the itinerary obtained, as shown in the state of agent 414. The security credentials can be a set of program identification and password, an X509 certificate, or an SAML (Security Assertion Markup Language) token, for example. These security credentials are used by the software agent to gain access to system resources and data at the destination systems The agent software interacts with user 412 to acquire a set of instructions, included as a second portion of the itinerary obtained, as shown in the state of agent 414. The instructions include data comprising a data standard (for example, Health Level Seven Clinical Document Architecture (HL7 CDA) for a medical records) for the input data, a data format (for example, rectangular, numeric, Extensible Markup Language (XML), comma separated values (CSV), tabular), or a name of a utility program for the agent software to use to access and transform the input data. The instructions further include data comprising a data standard and notation for the result data.

Having obtained an itinerary, a set of security credentials and a set of instructions, the agent software migrates, shown as the state of agent 416, toward designated systems using the respective itinerary. During a migration process, the agent software may automatically discover designated systems when metadata services are provided for data servers and data repositories. For example, as a result of processing at one destination a condition is raised requiring the software agent to deviate from a sequence specified in the itinerary to accommodate a the intermediate result of the prior destination. Thus a route described in an itinerary may be modified dynamically to respond to conditions including processing results or resource availabilities.

The agent software migrates to various systems, in this example system A 422 and system B 428, using a respective itinerary to access the data on the designated systems. In response to a need for credentials at a processing destination, the itinerary includes necessary credentials for use by a designated system for identification, authentication and authorization of the agent software to access the system resources and data, and instructions for data filtering and transformation.

In the example, the agent software in state 420 accesses system A 422 and performs a respective process using data available at the local system to generate an intermediate result as in result data 442. The agent software in state 420 depicts conveyance of both the itinerary 444 and result data 442.

The agent software repeats the previously described step to visit the next destination of system B 428 using one of the respective itinerary or a modification resulting from processing at system A 422. For example, when system B 428 was not specified directly in itinerary 444 but was discovered as a result of processing at system A 422 or because of a redirection due to resource availability. The agent software in state 426 depicts conveyance of both the itinerary 444 and result data 442 obtained at system B 428.

In response to a determination that the itinerary has been completed, the agent software returns to the system of user 412 conveying final result data inside the program. When the result data contains protected personal information or confidential information or the result data is too large, the agent software stores the final result data on a secured system and returns with a data locator. The data locator may be a Universal Resource Locator (URL) or a path name as used by a directory server to locate the final result referenced.

The agent software presents the final result in the form of result data 442 to user 412 and dissolves. When the agent software returns with the data locator, the data locator (for example, a universal resource locator, universal resource identifier, or path name) is presented to user 412 wherein the system, such as browser associated with user 412 presents the final result. The agent software in state 440 depicts conveyance of a final result in the form of result data 442 obtained from processing at system A 422 and at system B 428 but does not include itinerary 444 because the itinerary is complete. The final result is representative of processing at all respective destinations in a form dictated by the application, which performs the processing. The agent software is just a conveyor of the results obtained and is therefore independent of the result.

Figure 5:
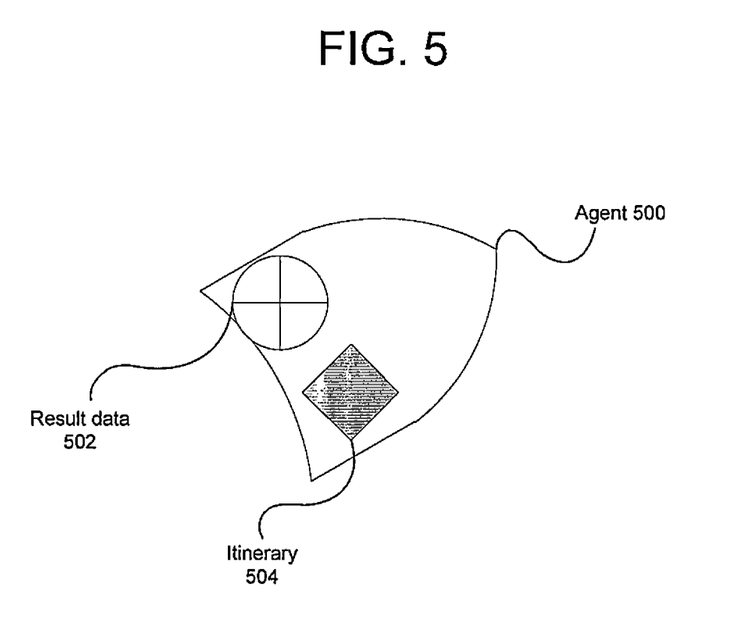
FIG. 5 is a block diagram of a logical representation of an agent of the agent software management system of FIG. 4, including a set of security credentials and a set of runtime instructions, operable for various embodiments of the disclosure.

With reference to FIG. 5 a block diagram of a logical representation of an agent of the agent software management system of FIG. 4 operable for various embodiments of the disclosure is presented. Agent 500 is an example of agent software of agent software management system 400 of FIG. 4 incorporating result data 502 and itinerary 504 information in one illustrative embodiment of the disclosed agent software management system. In the current example agent 500, result data 502 and itinerary 504 are representative of result data 442, itinerary 444 and agent 446 of FIG. 4. In an example embodiment of the disclosure, an itinerary includes a set of security credentials and also a set of runtime instructions.

Agent 500 is a logical software entity representative of computer executable program code having a capability of traversing a network according to an itinerary. The agent software travels to each respective destination of the itinerary to process data at the respective destinations to provide a final result to a requester. The data therefore does not leave the respective destinations; rather the agent software traverses the network to the one or more destinations to achieve the result requested.

Agent 500 is a conveyor of information in the form of an itinerary 504 (including security credentials and the runtime instructions) and subsequently intermediate results in an outbound direction from a requester and a final result in an inbound direction to the requester. Intermediate results and final result are referred to as result data 502. As a conveyor of data, agent 500 does not perform any processing with respect to the content of the result and therefore independent of the result. Presentation of the result to a requester is accordingly a responsibility of the system of the requester. For example, when the result is returned as reference to the data of the final result at a system other than the receiving system of the requester, the receiving system is responsible to resolve the reference and locate the referenced result.

Figure 6:
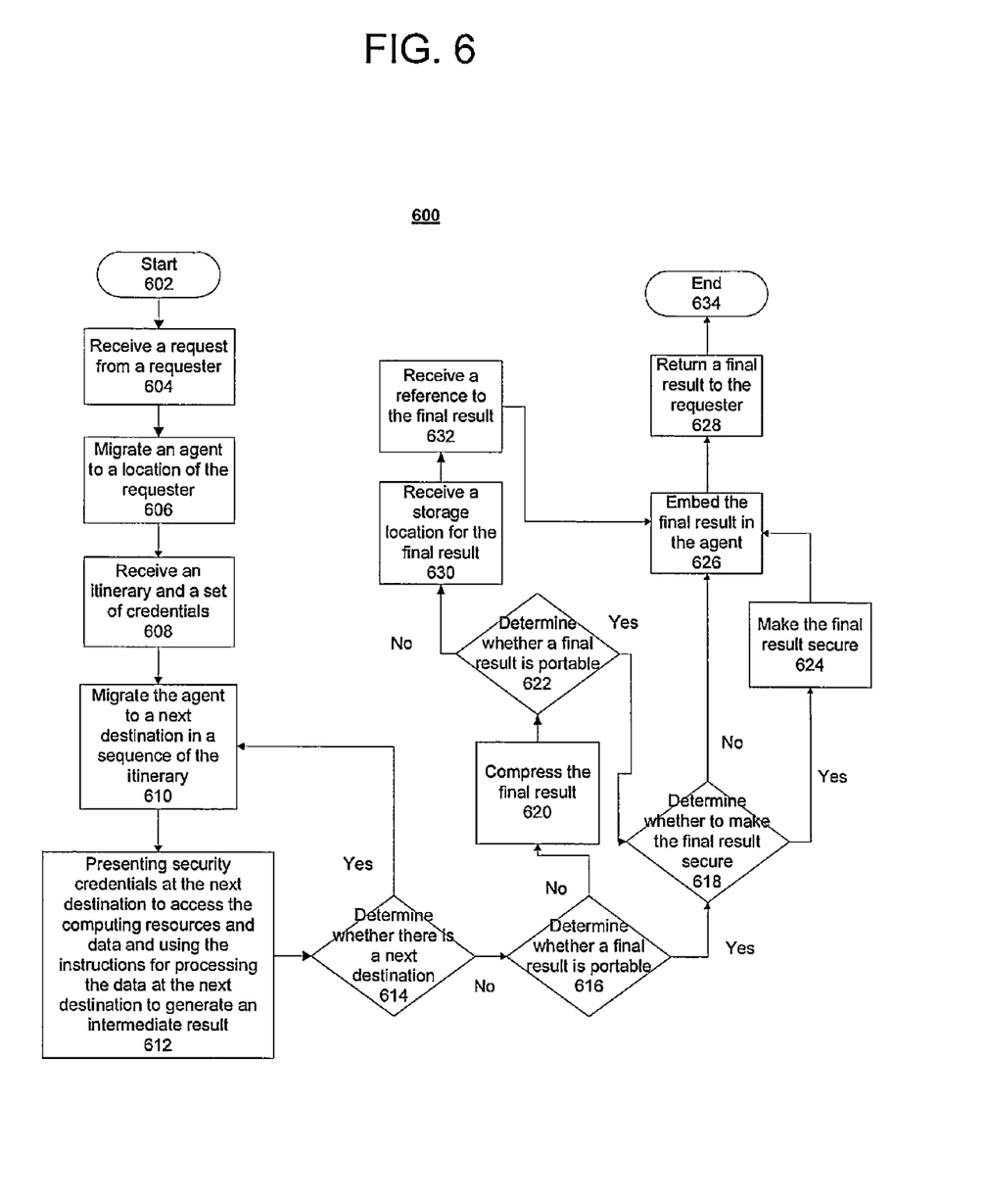
FIG. 6 is a flowchart of a process using the agent software management system of FIG. 3 operable for various embodiments of the disclosure.

With reference to FIG. 6 a flowchart of a process using the agent software management system of FIG. 3 operable for various embodiments of the disclosure is presented. Process 600 is an example of agent software as used in agent software management system 400 of FIG. 4 incorporating result data and itinerary information in one illustrative embodiment of the disclosed agent software management system.

Process 600 is an example of using a software agent to analyze data that is configured to visit one or more systems hosting secure or confidential data to perform particular processing, and creating or obtaining locators for the results so that results (or parts thereof) remain on the systems with the secure data rather than be transmitted across the network.

Process 600 begins (step 602) and received a request from a requester (step 604). The request initiates a selection of a software agent from a set of software agents, either directly by a user interaction or indirectly through program dependencies. The software agent is a mobile itinerant agent for processing sensitive data. The software agent of process 600 migrates to a location of the requester (step 606). At the location of the requester, process 600 obtains an itinerary including the security credentials and the runtime instructions (step 608). The agent uses the itinerary to map a course from one destination to another destination to complete the processing of data required for responding to the request. In addition the set of credentials enables access to one or more respective destinations and the runtime instructions enables specific processing to occur at a particular destination. The set of credentials and the runtime instructions may vary for each of the one or more destinations as needed by the one or more respective destinations.

The agent of process 600 migrates to a next destination in a sequence of the itinerary (step 610). The agent migrates to the destination to invoke a process using the data at the location. The data therefore remains in the protective custody of the destination and is not exposed to integrity issues during traversal of the network. Further at each process destination in the itinerary, credentials may be requested and verified prior to the agent being permitted to process data at a respective destination. Using this ensures veracity of the process throughout and the final result.

Process 600 presents the security credentials at the next destination to access the computing resources and data and uses the instructions carried within the software agent for processing the data to generate an intermediate result (step 612). The output of the processing is an intermediate result when multiple destinations are to be processed otherwise the result may be a final result.

Processing data at a destination using run time instructions from the set of run time instructions to generate a result further comprises presenting appropriate credentials to a system at the next destination to gain access to the resources and the data of the next destination. The next destination in this example is a destination in which processing is occurring currently. The process further identifies a structure and format of input data at the respective destination using the run time instructions from the set of run time instructions to generate a result (which is an intermediate result until a final result is generated from processing all destinations). In addition to identifying the structure and format of input data, a method to process the input data is identified at the respective destination using the run time instructions from the set of run time instructions to generate the result. A structure and format of output data of the result is also identified using the run time instructions in generating the result.

Process 600 determines whether there is a next destination (step 614). Determining the next destination using a sequence defined in the itinerary further comprises determining whether the next destination is skipped and responsive to a determination the next destination is skipped determining whether the next destination, which skipped, is in the vicinity (of the current location). A location may be skipped because the location is temporarily unavailable determining. Determining a next destination continues with a determination as to whether there is a next destination (after a skipped destination) using a sequence defined in the itinerary.

Responsive to a determination that there is a next destination, process 600 loops back to perform step 610 as before to migrate to a next destination. Responsive to a determination that there is not a next destination, process 600 determines whether the final result is portable (step 616). Portable is defined as a result capable of being conveyed by the agent of process 600. When the data is too large or the data is subject to Privacy compliance requirements, process 600 will not convey the data within the agent. For example, when the result data is an image, the software agent attempts to compress the final result to make the data portable and accordingly conveyed within the software agent (step 620).

As a result of the compression operation, a determination is made as to whether the compressed version is less than a predetermined size and therefore portable (step 622). Responsive to a determination the compressed version is less than the predetermined size the final result is determined to be portable. The portable version is suitable for embedding within the agent as binary code.

When the result cannot be conveyed, (because the result is too large (before and after compression) and/or contain personal data which is subject to the Privacy compliance) a request for a secure temporal storage location in a storage system of a trusted environment is performed to enable the final result to be maintained at the destination. In response process 600 receives a storage location for the final result (step 630). Process 600 presents an appropriate security credential to get permission to store the result and obtains a reference to the final result (a pointer or other reference indicator suitable for use to access the result data by a requester later) (step 632).

In this case process 600 arranges for the data to be located in a secure temporal location for which a pointer or reference is obtained. The reference may be, but not limited to a universal resource identifier, universal resource locator or a path statement leading to the data of the result.

Responsive to a determination that the final result is portable, process 600 determines whether to make the final result secure (step 618). Responsive to a determination to make the final result secure, process 600 makes the final result secure (step 624). Making the final result secure includes operations comprising encryption of the result, use of a message digest, hashing or other similar techniques using an external service to obfuscate the final result. Determining whether to make the final result secure includes determining whether the final result contains at least one of sensitive information or personal information protected by statues or regulations. Responsive to a determination the final result contains at least one of sensitive information or personal information protected by statues or regulations, the final result is encrypted and stored in a secure location, (alternatively stored in the secure location without encryption) wherein a reference is obtained for subsequent access to the final result in the secure location. Thus the final result containing the sensitive information or personal information protected by statues or regulations does not leave the protection of the location at which the final result was generated. Alternatively, each intermediate result may be stored in a protective location causing each of the intermediate results to be visited (using the security credentials) to gain access the information contained therein.

Process 600 embeds the final result in the agent (step 626). When the final result is a reference or pointer to the actual final result data, the reference is embedded, otherwise when the final result is portable the final result is embedded. Process returns the final result to the requester (step 628) and terminates thereafter (step 634).

Thus is presented in an illustrative embodiment a method for mobile itinerant agents for processing sensitive data, comprising in response to receiving a request from a requester, migrating an agent to a location of the requester; receiving an itinerary, a set of security credentials and a set of run time instructions for use at one or more destinations of the itinerary; migrating the agent autonomously from the location of the requester to a next destination in a sequence of the itinerary; and presenting one or more security credentials from the set of security credentials to gain access to the resources and data at the next destination. The method further processing data at the next destination using run time instructions from the set of run time instructions to generate a result; in response to a determination that there is no next destination, determining whether a final result is portable; and in response to a determination that the final result is portable, determining whether to make the final result secure. The method in response to a determination to make the final result secure, making the final result secure and embedding the final result in the agent.

The present invention provides a method for using agent software to perform data processing on computer systems $S_1, S_2, \ldots, S_N$ by having one or more processors $P_1, P_2, \ldots, P_N$ of computer systems $S_1, S_2, \ldots, S_N$ execute a set of run time instructions $I_1, I_2, \ldots, I_N$, respectively, and to return output resulting from the data processing to a user computer system $S_0$, wherein N is at least 1, and wherein an index n is initially 1. The method includes (i) receiving, by the one or more processors $P_n$ of computer system $S_n$, the agent software from computer system $S_{n-1}$; and (ii) executing, by the one or more processors $P_n$ of the computer system $S_n$, the set of run time instructions $I_n$ comprised by the agent software, wherein executing the set of run time instructions $I_n$ comprises utilizing resources and data comprised by computer system $S_n$ to generate an output result $R_n$ and storing the output result $R_n$ in the agent software and ascertaining whether n<N or n=N.

If it is ascertained that n<N, then executing the set of run time instructions $I_n$ comprises migrating the agent software to system $S_{n+1}$ after which the method comprises performing the receiving and the executing with the index n incremented by 1.

If it is ascertained that n=N, then executing the set of run time instructions $I_n$ comprises returning the agent software to computer system $S_0$ for enabling computer system $S_0$ to obtain a final result comprising the output results $R_1, R_2, \ldots, R_N$.

A computer program product of the present invention comprises one or more computer-readable storage devices and N sets of nm time instructions $I_1, I_2, \ldots, I_N$ respectively stored on the one or more computer-readable storage devices. The sets of run time instructions $I_1, I_2, \ldots, I_N$ which, upon being executed by one or more processors $P_1, P_2, \ldots, P_N$ of computer systems $S_1, S_2, \ldots, S_N$, respectively, implement the methods of the present invention.

A data processing system of the present invention comprises computer systems $S_1, S_2, \ldots, S_N$ that include a respective one or more processors $P_1, P_2, \ldots, P_N$ and a respective one or more memories $M_1, M_2, \ldots, M_N$, one or more computer-readable storage devices and N sets of run time instructions $I_1, I_2, \ldots, I_N$ stored on the one or more computer-readable storage devices. The sets of run time instructions $I_1, I_2, \ldots, I_N$ which, upon being executed by the one or more processors $P_1, P_2, \ldots, P_N$ of computer systems $S_1, S_2, \ldots, S_N$ via the one or more memories $M_1, M_2, \ldots, M_N$, respectively, implement the methods of the present invention.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs, but do not encompass computer readable propagation media. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Moderns, cable moderns, and Ethernet cards are just a few of the currently available types of network adapters.

What is claimed is:

1. A method for using agent software to perform data processing on computer systems $S_1, S_2, \ldots, S_N$ by having one or more processors $P_1, P_2, \ldots, P_N$ of computer systems $S_1, S_2, \ldots, S_N$ execute N sets of run time instructions $I_1, I_2, \ldots, I_N$, respectively, and to return output resulting from the data processing to a user computer system $S_0$, wherein N is at least 2, and wherein an index n is initially 1, said method comprising:

acquiring, by a computer processor of an agent computer system from the user computer system $S_0$ via interaction with a human user at the user computer system $S_0$, an identification of the agent software and a request for the agent software and in response, said agent computer system retrieving the agent software from a repository of agents comprising the agent software and migrating the retrieved agent software to the user computer system $S_0$, said request for the agent software being in response to a determination that use of the software agent, instead of performing the data processing without use of the agent software, avoids compromise of data integrity of sensitive data and further avoids transfer across a network of personal information, confidential information, and a volume of data that is large enough to cause unacceptable network latency and data propagation delay across the network;

acquiring by the computer processor of the agent computer system from the user computer system $S_0$ via interaction with the human user at the user computer system $S_0$, an itinerary, security credentials $C_1, C_2, \ldots, C_N$, and the N sets of run time instructions $I_1, I_2, \ldots, I_N$, said itinerary specifying a path along which the agent software is to migrate to perform the data processing on computer system $S_1, S_2, \ldots, S_N$ which appear in a sequential order of $S_1, S_2, \ldots, S_N$ on the path, said security credentials $C_1, C_2, \ldots, C_N$ being specific to computer system $S_1, S_2, \ldots, S_N$ for the agent software to gain access to resources and data comprised by computer system $S_1, S_2, \ldots, S_N$, said security credentials $C_1, C_2, \ldots, C_N$ differing from each other if N=2 or differing from one another if N>2;

providing, by the computer processor of the agent computer system to the agent software at the user computer system $S_0$, the received itinerary, security credentials, and the N sets of run time instructions $I_1, I_2, \ldots, I_N$;

receiving, by the one or more processors $P_n$ of computer system $S_n$, the agent software from computer system $S_{n-1}$;

executing, by the one or more processors $P_n$ of the computer system $S_n$, the set of run time instructions $I_n$ comprised by the agent software, said executing the set of run time instructions $I_n$ comprising utilizing resources and data comprised by computer system $S_n$ to generate an output result $R_n$ and storing the output result $R_n$ in the agent software and ascertaining whether n<N or n=N;

if said ascertaining ascertains that n<N, then said executing the set of run time instructions $I_n$ comprises migrating the agent software to system $S_{n+1}$ after which the method comprises performing said receiving and said executing with the index n incremented by 1;

if said ascertaining ascertains that n=N, then said executing the set of run time instructions $I_n$ comprises returning the agent software to computer system $S_0$ for enabling computer system $S_0$ to obtain a final result comprising the output results $R_1, R_2, \ldots, R_N$.

2. The method of claim 1, wherein after said receiving the agent software from computer system $S_{n-1}$ and before said utilizing resources and data comprised by computer system $S_n$, said executing the set of run time instructions $I_n$ comprises presenting one or more security credentials from the set of security credentials to gain access to the resources and data comprised by computer system $S_n$.

3. The method of claim 1, wherein said executing the set of run time instructions $I_n$ comprises:
   after said determining that n=N and before said returning the agent software to computer system $S_0$, determining that the final result is portable,
   wherein the agent software returned to computer system $S_0$ includes the final result.

4. The method of claim 1, wherein said executing the set of run time instructions $I_n$ comprises:
   after said determining that n=N and before said returning the agent software to computer system $S_0$, determining that the final result is not portable and in response, moving the final result from within the agent software to a storage location external to the agent software and storing in the agent software a reference that points to the storage location,
   wherein the agent software returned to computer system $S_0$ includes the reference to the storage location and does not include the final result.

5. The method of claim 1, wherein said executing the set of run time instructions $I_m$ (m=1, 2, or N−1) comprises:
   determining to skip migration of the agent software to a next computer system $S_{next}$ for execution, by one or more processors $P_{next}$ of the computer system $S_{next}$, of a set of run time instructions $I_{next}$ comprised by the agent software and instead to migrate the agent software to computer system $S_{m+1}$.

6. A computer program product, comprising one or more computer-readable storage devices and N sets of run time instructions $I_1, I_2, \ldots, I_N$ respectively stored on the one or more computer-readable storage devices, said sets of run time instructions $I_1, I_2, \ldots, I_N$ which, upon being executed by one or more processors $P_1, P_2, \ldots, P_N$ of computer systems $S_1, S_2, \ldots, S_N$, respectively, implement a method for using agent software to perform data processing on computer systems $S_1, S_2, \ldots, S_N$ and to return output resulting from the data processing to a user computer system $S_0$, wherein N is at least 2, and wherein an index n is initially 1, said method comprising:

acquiring, by a computer processor of an agent computer system from the user computer system $S_0$ via interaction with a human user at the user computer system $S_0$, an identification of the agent software and a request for the agent software and in response, said agent computer system retrieving the agent software from a repository of agents comprising the agent software and migrating the retrieved agent software to the user computer system $S_0$, said request for the agent software being in response to a determination that use of the software agent, instead of performing the data processing without use of the agent software, avoids compromise of data integrity of sensitive data and further avoids transfer across a network of personal information, confidential information, and a volume of data that is large enough to cause unacceptable network latency and data propagation delay across the network;

acquiring by the computer processor of the agent computer system from the user computer system $S_0$ via interaction with the human user at the user computer system $S_0$, an itinerary, security credentials $C_1$, $C_2, \ldots, C_N$, and the N sets of run time instructions $I_1$, $I_2, \ldots, I_N$, said itinerary specifying a path along which the agent software is to migrate to perform the data processing on computer system $S_1, S_2, \ldots, S_N$ which appear in a sequential order of $S_1, S_2, \ldots, S_N$ on the path, said security credentials $C_1, C_2, \ldots, C_N$ being specific to computer system $S_1, S_2, \ldots, S_N$ for the agent software to gain access to resources and data comprised by computer system $S_1, S_2, \ldots, S_N$, said security credentials $C_1, C_2, \ldots, C_N$ differing from each other if N=2 or differing from one another if N>2;

providing, by the computer processor of the agent computer system to the agent software at the user system, the received itinerary, security credentials, and the N sets of run time instructions $I_1, I_2, \ldots, I_N$;

receiving, by the one or more processors $P_n$ of computer system $S_n$, the agent software from computer system $S_{n-1}$;

executing, by the one or more processors $P_n$ of the computer system $S_n$, the set of run time instructions $I_n$ comprised by the agent software, said executing the set of run time instructions $I_n$ comprising utilizing resources and data comprised by computer system $S_n$ to generate an output result $R_n$ and storing the output result $R_n$ in the agent software and ascertaining whether n<N or n=N;

if said ascertaining ascertains that n<N, then said executing the set of run time instructions $I_n$ comprises migrating the agent software to system $S_{n+1}$ after which the method comprises performing said receiving and said executing with the index n incremented by 1;

if said ascertaining ascertains that n=N, then said executing the set of run time instructions $I_n$ comprises returning the agent software to computer system $S_0$ for enabling computer system $S_0$ to obtain a final result comprising the output results $R_1, R_2, \ldots, R_N$.

7. The computer program product of claim 6, wherein after said receiving the agent software from computer system $S_{n-1}$ and before said utilizing resources and data comprised by computer system $S_n$, said executing the set of run time instructions $I_n$ comprises presenting one or more security credentials from the set of security credentials to gain access to the resources and data comprised by computer system $S_n$.

8. The computer program product of claim 6, wherein said executing the set of run time instructions $I_n$ comprises:

after said determining that n=N and before said returning the agent software to computer system $S_0$, determining that the final result is portable, wherein the agent software returned to computer system $S_0$ includes the final result.

9. The computer program product of claim 6, wherein said executing the set of run time instructions $I_n$ comprises:

after said determining that n=N and before said returning the agent software to computer system $S_0$, determining that the final result is not portable and in response, moving the final result from within the agent software to a storage location external to the agent software and storing in the agent software a reference that points to the storage location, wherein the agent software returned to computer system $S_0$ includes the reference to the storage location and does not include the final result.

10. A data processing system comprising computer systems $S_1, S_2, \ldots, S_N$ that include a respective one or more processors $P_1, P_2, \ldots, P_N$ and a respective one or more memories $M_1, M_2, \ldots, M_N$, one or more computer-readable storage devices and N sets of run time instructions $I_1$, $I_2, \ldots, I_N$ stored on the one or more computer-readable storage devices, said sets of run time instructions $I_1$, $I_2, \ldots, I_N$ which, upon being executed by the one or more processors $P_1, P_2, \ldots, P_N$ of computer systems $S_1$, $S_2, \ldots, S_N$ via the one or more memories $M_1, M_2, \ldots, M_N$, respectively, implement a method for using agent software to perform data processing on computer systems $S_1$, $S_2, \ldots, S_N$ and to return output resulting from the data processing to a user computer system $S_0$, wherein N is at least 2, and wherein an index n is initially 1, said method comprising:\ acquiring, by a computer processor of an agent computer system from the user computer system $S_0$ via interaction with a human user at the user computer system $S_0$, an identification of the agent software and a request for the agent software and in response, said agent computer system retrieving the agent software from a repository of agents comprising the agent software and migrating the retrieved agent software to the user computer system $S_0$, said request for the agent software being in response to a determination that use of the software agent, instead of performing the data processing without use of the agent software, avoids compromise of data integrity of sensitive data and further avoids transfer across a network of personal information, confidential information, and a volume of data that is large enough to cause unacceptable network latency and data propagation delay across the network;

acquiring by the computer processor of the agent computer system from the user computer system $S_0$ via interaction with the human user at the user computer system $S_0$, an itinerary, security credentials $C_1$, $C_2, \ldots, C_N$, and the N sets of run time instructions $I_1$, $I_2, \ldots, I_N$, said itinerary specifying a path along which the agent software is to migrate to perform the data processing on computer system $S_1, S_2, \ldots, S_N$ which appear in a sequential order of $S_1, S_2, \ldots, S_N$ on the path, said security credentials $C_1, C_2, \ldots, C_N$ being specific to computer system $S_1, S_2, \ldots, S_N$ for the agent software to gain access to resources and data comprised by computer system $S_1, S_2, \ldots, S_N$, said security credentials $C_1, C_2, \ldots, C_N$ differing from each other if N=2 or differing from one another if N>2;

receiving, by the one or more processors $P_n$ of computer system $S_n$, the agent software from computer system $S_{n-1}$;

executing, by the one or more processors $P_n$ of the computer system $S_n$, the set of run time instructions $I_n$ comprised by the agent software, said executing the set of run time instructions $I_n$ comprising utilizing resources and data comprised by computer system $S_n$ to generate an output result $R_n$ and storing the output result $R_n$ in the agent software and ascertaining whether n<N or n=N;

if said ascertaining ascertains that n<N, then said executing the set of run time instructions $I_n$ comprises migrating the agent software to system $S_{n+1}$ after which the method comprises performing said receiving and said executing with the index n incremented by 1;

if said ascertaining ascertains that n=N, then said executing the set of run time instructions $I_n$ comprises returning the agent software to computer system $S_0$ for enabling computer system $S_0$ to obtain a final result comprising the output results $R_1, R_2, \ldots, R_N$.

11. The data processing system of claim 10,
wherein after said receiving the agent software from computer system $S_{n-2}$ and before said utilizing resources and data comprised by computer system $S_n$, said executing the set of run time instructions $I_n$ comprises presenting one or more security credentials from the set of security credentials to gain access to the resources and data comprised by computer system $S_n$.

12. The data processing system of claim 10, wherein said executing the set of run time instructions $I_n$ comprises:
after said determining that n=N and before said returning the agent software to computer system $S_0$, determining that the final result is portable,
wherein the agent software returned to computer system $S_0$ includes the final result.

13. The data processing system of claim 10, wherein said executing the set of run time instructions $I_n$ comprises:
after said determining that n=N and before said returning the agent software to computer system $S_0$, determining that the final result is not portable and in response, moving the final result from within the agent software to a storage location external to the agent software and storing in the agent software a reference that points to the storage location,
wherein the agent software returned to computer system $S_0$ includes the reference to the storage location and does not include the final result.

\* \* \* \* \*